(12) United States Patent
Yeckley (10) Patent No.: US 7,223,709 B2
(45) Date of Patent: May 29, 2007

(54) METHOD OF MAKING A SIAlON CERAMIC

(75) Inventor: Russell L. Yeckley, Latrobe, PA (US)

(73) Assignee: Kennametal Inc., Latrobe, PA (US)

(*) Notice: Subject to any disclaimer, the term of this patent is extended or adjusted under 35 U.S.C. 154(b) by 0 days.

(21) Appl. No.: 11/472,976

(22) Filed: Jun. 22, 2006

(65) Prior Publication Data

US 2006/0240971 A1 Oct. 26, 2006

Related U.S. Application Data

(62) Division of application No. 11/054,004, filed on Feb. 9, 2005.

(51) Int. Cl.
*C04B 35/599* (2006.01)
(52) U.S. Cl. .................... 501/98.2; 501/98.3
(58) Field of Classification Search ............ 501/98.2, 501/98.3
See application file for complete search history.

(56) References Cited

U.S. PATENT DOCUMENTS

| 4,547,470 A | 10/1985 | Tanase et al. |
| 4,563,433 A | 1/1986 | Yeckley et al. |
| 4,711,644 A | 12/1987 | Yeckley et al. |
| 4,770,673 A | 9/1988 | Ketcham et al. |

(Continued)

FOREIGN PATENT DOCUMENTS

JP 04002664 A2 1/1992

(Continued)

OTHER PUBLICATIONS

Wittmer et al. "Economic Comparison of Continuous and Batch Sintering of Silicon Nitride", Am. Cer. Soc. Bulletin vol. 72, No. 6 (1993) pp. 129-137.

(Continued)

*Primary Examiner*—Karl Group (74) *Attorney, Agent, or Firm*—John J. Prizzi (57) ABSTRACT

A method of making a SiAlON ceramic body that includes a two phase composite comprising an alpha prime SiAlON phase and a beta prime SiAlON phase, the method includes the steps of: providing a starting powder that comprises at least about 70 weight percent silicon nitride powder and one or more other powders that provide aluminum, oxygen, nitrogen, and at least two selected rare earth elements to the SiAlON ceramic body wherein the rare earth elements are selected from at least two groups of the following three groups of rare earth elements wherein Group I comprises La, Ce, Pr, Nd, Pm, Sm and Eu, and Group II comprises Gd, Tb, Dy and Ho, and Group III comprises Er, Tm, Yb and Lu; and consolidating the starting powder mixture to form a ceramic body comprising a two phase composite comprising an alpha prime SiAlON phase and a beta prime SiAlON phase, and the alpha prime SiAlON phase containing one or more of the selected rare earth elements excluding La and Ce, and the ceramic body having a composition falling within the area bounded by the trapezoid defined by points A, B, C and D in FIG. 7.

20 Claims, 5 Drawing Sheets

U.S. PATENT DOCUMENTS

| | | | |
|---|---|---|---|
| 4,826,791 | A | 5/1989 | Mehrotra et al. |
| 4,913,936 | A | 4/1990 | Mehrotra et al. |
| 5,173,458 | A * | 12/1992 | Nishioka et al. ........... 501/97.3 |
| 5,200,374 | A | 4/1993 | Yamada et al. |
| 5,370,716 | A * | 12/1994 | Mehrotra et al. ............. 51/293 |
| 5,413,972 | A | 5/1995 | Hwang et al. |
| 5,648,042 | A | 7/1997 | Miller, Jr. |
| 5,908,798 | A | 6/1999 | Chen et al. |
| 6,124,225 | A | 9/2000 | Tien et al. |
| 6,610,113 | B1 | 8/2003 | Mehrotra et al. |
| 6,693,054 | B1 * | 2/2004 | Yeckley ..................... 501/98.2 |
| 7,049,256 | B2 * | 5/2006 | Yeckley ..................... 501/98.2 |
| 7,064,095 | B2 * | 6/2006 | Mandal et al. ............. 501/98.2 |
| 7,094,717 | B2 * | 8/2006 | Yeckley ..................... 501/98.2 |
| 2004/0067838 | A1 * | 4/2004 | Mandal et al. ............. 501/98.2 |

FOREIGN PATENT DOCUMENTS

| | | |
|---|---|---|
| JP | 04046062 A2 | 2/1992 |
| JP | HEI-5-43333 | 2/1993 |
| JP | 2988966 | 10/1999 |
| WO | WO 00/02829 | 1/2000 |
| WO | WO 02/44104 A2 | 6/2002 |

OTHER PUBLICATIONS

Wittmer et al. "Comparison of Continuous Sintering to Batch Sintering of Si3N4", Cer. Bulletin, vol. 70, No. 9 (1991) pp. 1519-1527.

Wittmer et al. "Continuous Sintering of Si3N4 in a Controlled atmosphere Belt Furnace", Cer. Eng. & Science Proceedings, vol. 13, No. 7-8 (1992) pp. 546-562.

Mencik et al. "Quantitative Phase Analysis of Synthetic Silicon Nitride by X-Ray Diffraction", Advances in X-Ray Analysis, vol. 23, (1979) pp. 375-379.

Evans and Charles,"Fracture Toughness Determination by Identation", Jr. Am. Cer. Soc. vol. 59, Nos. 7-8 pp. 371-372.

Gauckler et al. "Representation of Multicomponent Silicon Nitride Based Systems", Nitrogen Ceramics, Nordoff Intl. (1977) pp. 41-60.

Izhevskiy et al. "Progree in SiAION Ceramics" Journal of European Cer. Soc. 20, (2000) pp. 2275-2295.

Shen et al.,"Reactions Occuring in Post Heat-Treated Alpha-Beta Sialons: On the Thermal Stability of Alpha SiAION"Jr. European Cer. Soc. 16 (1996) pp. 873-883.

Wang et al., "Preparation of R-Alpha Beta-SiAIONs by Pressureless Sintering", Jr. European Cer. Soc. 13 (1994) pp. 461-465.

Nordberg et al., "Stability and Oxidation Properties of RE-alpha-Sialon Ceramics",J. Am. Cer. Soc. 81 No. 6, (1998) pp. 1461-1470.

Notification of Transmittal of the International Search Report for PCT/US/ 06/04616 mailed Jan. 3, 2007 (1 page).

International Search Report for PCT/US 06/04616 mailed Jan. 3, 2007 (2 pages).

Writen Opinion ofthe International Searching Authority for PCTUS 06/04616 mailed Jan. 3, 2007 (4 pages).

* cited by examiner

METHOD OF MAKING A SIAlON CERAMIC

CROSS REFERENCE TO EARLIER PATENT APPLICATION

This patent is a divisional of pending U.S. patent application Ser. No.11/054,004 filed on Feb. 9, 2005 for SiAlON CERAMIC AND METHOD OF MAKING THE SAME by Yeckley.

BACKGROUND OF THE INVENTION

The invention pertains to a ceramic material, as well as a method of making the same, that contains silicon aluminum oxynitride (SiAlON) and a rare earth constituent.

SiAlON materials have a number of uses such as, for example, cutting inserts for various metal cutting application and wear parts for various wear applications (e.g., plunger rods for pumps, plunger ball blanks, down hole pump check valve blanks, bushings, blast nozzles, and other wear and impact applications). Exemplary patents that disclose SiAlON materials are U.S. Pat. No. 4,563,433 to Yeckley and U.S. Pat. No. 4,711,644 to Yeckley, as well as U.S. Pat. No. 6,693,054 to Yeckley. One article that discusses SiAlON materials is Izhevskiy et al., "Progress in SiAlON ceramics, Journal of the European Ceramic Society 20 (2000) pages 2275-2295.

SiAlON materials may contain an alpha prime (or alpha') phase and a beta prime (or beta') phase and one or more other phases such as, for example, a glassy phase and/or a crystalline phase. The alpha prime SiAlON phase may be of the formula $M_xSi_{12-(m+n)}Al_{m+n}O_nN_{16-n}$ where M is Li, Ca, Y, Mg or other lanthanides and where the theoretical maximum of x is 2, the value of n ranges between greater than 0 and less than or equal to 2.0, and the value of m ranges between greater than or equal to 0.9 and less than or equal to 3.5. The beta prime SiAlON phase may be of the formula $Si_{6-z}Al_zO_zN_{8-z}$ where $0<z\leq4.2$.

The above-mentioned U.S. Pat. No. 6,693,054 to Yeckley discloses a SiAlON material that contains an alpha prime SiAlON phase and a beta prime SiAlON phase. This ceramic material has a ytterbium addition so that the alpha prime SiAlON phase has the formula $Yb_xSi_{(m+n)}Al_mO_nN_{16m}$. In some instances, there was a glassy phase or a crystalline phase that was present. Further, U.S. Pat. No. 6,693,054 to Yeckley discloses a process to make the alpha-beta SiAlON containing ytterbium using a silicon nitride starting powder that contains either no or a low amount (i.e., an amount that has a lower limit equal to zero weight percent and an upper limit equal to about 1.6 weight percent) of beta silicon nitride.

SiAlON materials may comprise an alpha prime SiAlON phase and a beta prime SiAlON phase, as well as further contain silicon carbide particles dispersed throughout the SiAlON matrix. Such a SiAlON material is disclosed in U.S. Pat. No. 4,826,791 to Mehrotra et al.

U.S. Pat. No. 5,370,716 to Mehrotra et al. discloses a high Z-SiAlON material comprising beta prime SiAlON phase. The beta prime SiAlON phase has a formula $Si_{6-z}Al_zO_zN_{8-z}$ where $1<z<3$.

U.S. Pat. No. 5,908,798 to Chen et al. discloses a SiAlON ceramic that has a relatively high proportion (i.e., greater than any other phase present) of alpha prime SiAlON. The '798 Pat. to Chen et al. lists the following additives: Li, Mg, Ca, Y, Nd, Sm, Gd, Tb, Dy, Ho, Er, Tm, Yb, Lu, or mixtures thereof. The more preferably additives are Nd, Yb, Sm, Y, Li, or mixtures thereof. Each one of the examples of the '798 Pat. to Chen et al. appears to use only one of the additives identified in the listing. The '798 Patent to Chen et al. appears to use a starting silicon nitride powder that comprises about 93 weight percent beta silicon nitride and about 7 weight percent alpha silicon nitride. Chen et al. does not appear to address a SiAlON ceramic that is made from a starting powder mixture that includes silicon nitride starting powder that contains either no or a low amount of (i.e., an amount that has a lower limit equal to zero weight percent and an upper limit equal to about 1.6 weight percent) beta silicon nitride.

U.S. Pat. No. 5,413,972 to Hwang et al. discloses a substantially glass-free alpha-beta SiAlON ceramic material that includes an additive that is the cationic element M in the alpha-SiAlON phase with the formula: $M_x(Si,Al)_{12}(O,N)_{16}$ wherein $0<x<2$. These additives are Sr, Ca, Mg, Li, Na, Ce, Y, Nd, Sm, Gd, Dy, Er, and Yb. The specific examples use yttrium (Y) and strontium (Sr) added as their oxides to the starting powder mixture. The silicon nitride starting powder is from UBE Industries, Inc. and available under the designation SNE-10. The Tien et al. patent states that the $\beta/(\alpha+\beta)$ ratio for SNE-10 is less than 5 percent. Applicant believes that SNE-10 silicon nitride powder from UBE Industries, Inc. contains about 2 weight percent beta silicon nitride with the balance comprising alpha silicon nitride along with unavoidable impurities. The '972 Patent to Hwang et al. does not appear to address a SiAlON ceramic that is made from a starting powder mixture that includes silicon nitride starting powder that contains either no or a low amount of (i.e., an amount that has a lower limit equal to zero weight percent and an upper limit equal to about 1.6 weight percent) beta silicon nitride.

U.S. Pat. No. 6,124,225 to Tien et al. discloses a SiAlON ceramic material that has a high proportion of alpha prime SiAlON. Tien et al. lists the following additives Nd, Sm, Gd, Dy, Yb and Y and mixtures thereof with Gd being the preferred additive. In one preferred embodiment, the starting silicon nitride powder has about 95 weight percent alpha silicon nitride. The '225 Patent to Tien et al. does not appear to address a SiAlON ceramic that is made from a starting powder mixture that includes silicon nitride starting powder that contains either no or a low amount of (i.e., an amount that has a lower limit equal to zero weight percent and an upper limit equal to about 1.6 weight percent) beta silicon nitride.

U.S. Pat. No. 5,200,374 to Yamada et al. discloses an alpha-beta SiAlON ceramic material. The '374 Patent to Yamada et al. lists a number of the additives as follows: Ho, Er, Tm, Yb or Lu wherein the examples appear to use only one additive. The starting powders appear to include alpha-SiAlON powder and a silicon nitride powder that appears to have properties like those of the Ube Industries SNE-10 powder wherein applicant believes that the UBE-10 silicon nitride powder contains about 2 weight percent beta silicon nitride with the balance comprising alpha silicon nitride along with unavoidable impurities. The '374 Patent to Yamada et al. does not appear to address a SiAlON ceramic that is made from a starting powder mixture that includes silicon nitride starting powder that contains either no or a low amount of (i.e., an amount that has a lower limit equal to zero weight percent and an upper limit equal to about 1.6 weight percent) beta silicon nitride.

Japanese Patent Publication No. 5-43333 to UBE Industries lists Ho, Er, Tm, Yb and Lu as additives for a SiAlON ceramic material. The examples appear to use only one additive. This Japanese Patent Publication does not appear to address a SiAlON ceramic that is made from a starting powder mixture that includes silicon nitride starting powder that contains at least 2 weight percent and possibly a greater content of beta silicon nitride.

The Shen et al. article (Journal of the European Ceramic Society 16 (1996) pp. 873-883) entitled "Reactions Occurring in Post Heat-Treated α/β Sialons: On the Thermal Stability of α-SiAlON" lists the following elements that are used alone: Nd, Sm, Dy and Yb. The starting silicon nitride powder was identified in the article as UBE SN-E10. There does not appear to be any teaching in the Shen et al. article directed to a SiAlON ceramic that is made from a starting powder mixture that includes silicon nitride starting powder that contains either no or a low amount of (i.e., an amount that has a lower limit equal to zero weight percent and an upper limit equal to about 1.6 weight percent) beta silicon nitride.

The Wang et al. article (Journal of the European Ceramic Society 13 (1994) pp. 461-465) entitled "Preparation of R-α'β'-Sialons (R=Sm, Gd, Dy, Y and Yb) by Pressureless Sintering" lists the following elements: Sm, Gd, Dy, Y and Yb. The examples appear to show these elements used alone and not in combination with one another. The kind of silicon nitride starting powder appears to be unknown since it was laboratory and contains 1.5% oxygen. In the Wang et al. article, there does not appear to be any teaching directed to a SiAlON ceramic that is made from a starting powder mixture that includes silicon nitride starting powder that contains either no or a low amount of (i.e., an amount that has a lower limit equal to zero weight percent and an upper limit equal to about 1.6 weight percent) beta silicon nitride.

The Nordberg et al. article (J American Ceramic Society 81 [6] pp. 1461-70 (1998)) entitled "Stability and Oxidation Properties of RE-α-Sialon Ceramics (RE=Y, Nd, Sm, Yb)" discloses that alpha-SiAlON can be formed using additives. The examples appear to use only one rare earth element (e.g., Nd, Sm, or Yb). The article describes the starting silicon nitride powder as UBE, SN-E10. There do not appear to be any teaching about a SiAlON ceramic that is made from a starting powder mixture that includes silicon nitride starting powder that contains either no or a low amount of (i.e., an amount that has a lower limit equal to zero weight percent and an upper limit equal to about 1.6 weight percent) beta silicon nitride.

U.S. Pat. No. 4,547,470 to Tanase et al. discloses either yttrium alone or erbium alone as an additive in the SiAlON, and discloses the use of zirconium in the form of zirconium carbonitride in connection with a SiAlON. The starting silicon nitride powder comprises 90 volume percent alpha silicon nitride. The '470 Patent to Tanase et al. does not appear to address a SiAlON ceramic that is made from a starting powder mixture that includes silicon nitride starting powder that contains either no or a low amount of (i.e., an amount that has a lower limit equal to zero weight percent and an upper limit equal to about 1.6 weight percent) beta silicon nitride.

Japanese Patent No. 2,988,966 to Hitachi Metals Co. Ltd. discloses an alpha-beta SiAlON that includes an element selected from Y, Er and Yb. Only one examples uses two elements (Er and Yb). The starting silicon nitride powder has an alpha conversion ratio equal to 93% so that it equate to a powder that contains 7 weight percent beta silicon nitride.

Japanese Patent Publication 4002664A, based on an English abstract, discloses a SiAlON ceramic that can use the following elements: Ho, Er, Tm, Yb or Lu that are used along with Hf or Zr. This Japanese document does not address a SiAlON ceramic that is made from a starting powder mixture that includes silicon nitride starting powder that contains either no or a low amount of (i.e., an amount that has a lower limit equal to zero weight percent and an upper limit equal to about 1.6 weight percent) beta silicon nitride.

Although current SiAlON ceramic bodies, such as for example, cutting inserts exhibit acceptable properties (e.g., hardness, toughness, thermal shock resistance) it would be desirable to provide for an improved SiAlON material that has application as a cutting insert that exhibits improved metal cutting performance properties including hardness, Young's modulus, toughness, thermal conductivity, and thermal shock resistance. The same is true for SiAlON wear parts in that although current SiAlON wear parts have acceptable properties (e.g., hardness, Young's modulus, toughness, thermal conductivity, and thermal shock resistance), it would be desirable to provide an improved SiAlON material that has application as a wear part that exhibits improved properties.

In this regard, in the sintering of a powder mixture to make SiAlON material, crystalline phases can form in the grain boundaries between the alpha prime SiAlON grains and the beta prime SiAlON grains. An increase in the content of crystalline phases in the grain boundaries can result in a reduction of the fracture toughness of the SiAlON material. Hence, it would be desirable to provide a SiAlON material that has a minimal amount of the crystalline phase(s) that have formed in the grain boundaries.

The temperature at which the additives form a liquid phase can impact upon the densification of the SiAlON body. In order to improve the densification of the SiAlON body, it would be advantageous to use additives that form a liquid phase at a relatively lower temperature.

Along this same line, it would be advantageous in regard to the formation of the alpha prime SiAlON phase to use additive(s) that would form and maintain an intergranular liquid phase upon sintering and throughout the sintering cycle (i.e., a non-binding liquid phase-forming additive). In this situation, essentially none of the non-binding liquid phase-forming additives would become a part of the alpha prime SiAlON phase, i.e., there would be essentially no detectable amount of the non-binding liquid phase—forming additive in the alpha prime SiAlON phase. More specifically, what this means is that in the case where the grains of the alpha prime SiAlON phase are sufficiently large (i.e., on the order of greater than or equal to about 2 micrometers in diameter) one does not detect the presence of such non-binding liquid phase-forming additives in the grains of the alpha prime SiAlON phase through the use of energy dispersive spectrum-scanning electron microscopy (EDS/SEM) techniques. The result of the absence of any detectable amount of non-binding liquid phase-forming additive in the alpha prime SiAlON phase would be that the liquid phase would be maintained through the sintering cycle. By maintaining the liquid phase during the sintering cycle, the amount of alpha prime SiAlON phase that would be formed increases. Applicant believes that it would be desirable to provide a SiAlON ceramic body that has an increased content of alpha prime SiAlON phase.

SiAlON ceramic material that exhibits a higher hardness has advantages for use in certain applications as a cutting insert and as a wear part. Typically, a SiAlON ceramic material that has a finer grain size results in a higher hardness. Thus, it would be desirable to provide a SiAlON ceramic material that has a finer grain size, and hence, a higher hardness.

SUMMARY OF THE INVENTION

In one form thereof, the invention is a SiAlON ceramic body made from a starting powder mixture that includes silicon nitride powder and one or more powders that provide aluminum, oxygen, nitrogen, and at least two selected rare earth elements to the SiAlON ceramic body wherein the selected rare earth elements are selected from at least two groups of the following three groups of rare earth elements wherein Group I comprises La, Ce, Pr, Nd, Pm, Sm and Eu, and Group II comprises Gd, Th, Dy and Ho, and Group III comprises Er, Tm, Yb and Lu. The SiAlON ceramic body includes a two phase composite that includes an alpha prime SiAlON phase and a beta prime SiAlON phase wherein the alpha prime SiAlON phase contains one or more of the selected rare earth elements excluding La and Ce. The silicon nitride powder makes up at least about 70 weight percent of the starting powder mixture wherein the beta-silicon nitride content of the silicon nitride powder has a lower limit equal to zero weight percent and an upper limit equal to about 1.6 weight percent of the silicon nitride powder.

In another form thereof, the invention is a SiAlON ceramic body made from a starting powder mixture that includes silicon nitride powder and one or more powders that provide aluminum, oxygen, nitrogen, and at least two selected rare earth elements to the SiAlON ceramic body wherein the rare earth elements are selected from at least two groups of the following three groups of rare earth elements wherein Group I comprises La, Ce, Pr, Nd, Pm, Sm and Eu, and Group II comprises Gd, Tb, Dy and Ho, and Group III comprises Er, Tm, Yb and Lu. The SiAlON ceramic body comprises a two phase composite that includes an alpha prime SiAlON phase and a beta prime SiAlON phase. The alpha prime SiAlON phase contains one or more of the selected rare earth elements excluding La and Ce. The ceramic body has a composition falling within the area bounded by the trapezoid defined by points A, B, C and D in FIG. 7. The silicon nitride powder comprises at least about 70 weight percent of the starting powder mixture. The beta-silicon nitride content of the silicon nitride powder has a lower limit equal to zero weight percent and an upper limit equal to about 1.6 weight percent of the silicon nitride powder.

Figure 7:
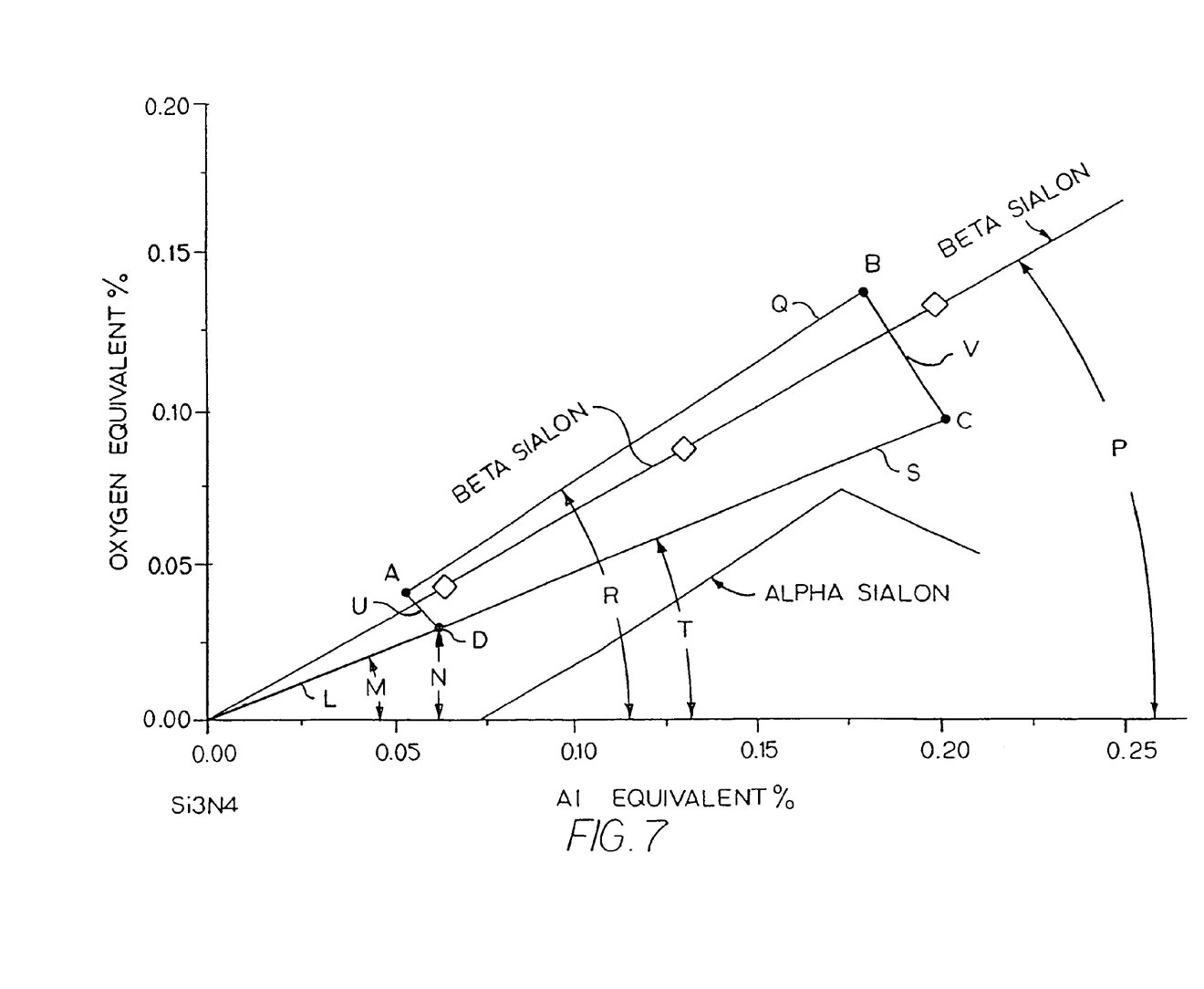
FIG. 7 is a graph that plots the aluminum equivalents in percent against the oxygen equivalents in percent for ceramic bodies wherein the compositional area of interest is shown by the area defined by Points A, B, C and D.

In still another form thereof, the invention is a method of making a SiAlON ceramic body that comprises a two phase composite comprising an alpha prime SiAlON phase and a beta prime SiAlON phase, the method comprising the steps of: providing a starting powder that comprises at least about 70 weight percent silicon nitride powder and one or more other powders that provide aluminum, oxygen, nitrogen, and at least two selected rare earth elements to the SiAlON ceramic body wherein the rare earth elements are selected from at least two groups of the following three groups of rare earth elements wherein Group I comprises La, Ce, Pr, Nd, Pm, Sm and Eu, and Group II comprises Gd, Th, Dy and Ho, and Group III comprises Er, Tm, Yb and Lu; and consolidating the starting powder mixture to form a ceramic body comprising a two phase composite comprising an alpha prime SiAlON phase and a beta prime SiAlON phase, and the alpha prime SiAlON phase containing one or more of the selected rare earth elements excluding La and Ce, and the ceramic body having a composition falling within the area bounded by the trapezoid defined by points A, B, C and D in FIG. 7.

In yet another form thereof, the invention is a SiAlON ceramic body made from a starting powder mixture that includes silicon nitride powder and one or more powders that provide aluminum, oxygen, nitrogen, a liquid phase-forming element, and at least one selected rare earth element to the SiAlON ceramic body. In the case of a single of the selected rare earth element, the selected rare earth element is selected from any of the following groups wherein Group I comprises Pr, Nd, Pm, Sm and Eu, and Group II comprises Gd, Tb, Dy and Ho, and Group III comprises Er, Tm, Yb and Lu. In the case of a plurality of the selected rare earth elements, the rare earth elements are selected from at least two groups of the following three groups of rare earth elements wherein Group IA comprises La, Ce, Pr, Nd, Pm, Sm and Eu, and Group II comprises Gd, Th, Dy and Ho, and Group III comprises Er, Tm, Yb and Lu. The SiAlON ceramic body comprises a two phase composite comprising an alpha prime SiAlON phase and a beta prime SiAlON phase wherein the alpha prime SiAlON phase containing one or more of the selected rare earth elements excluding La and Ce. The silicon nitride powder comprises at least about 70 weight percent of the starting powder mixture, the beta-silicon nitride content of the silicon nitride powder has a lower limit equal to zero weight percent and an upper limit equal to about 1.6 weight percent of the silicon nitride powder.

BRIEF DESCRIPTION OF THE DRAWINGS

The following is a brief description of the drawings that accompany and form a part of this patent application.

DETAILED DESCRIPTION OF THE INVENTION

SiAlON ceramic materials have been used as cutting inserts in a variety of metalcutting applications. SiAlON ceramic materials have also been used as wear parts for various wear applications and impact parts for various impact applications. The SiAlON ceramic material of the present invention has application as a cutting insert, a wear part, an impact part, and any other article wherein the properties of a hard dense ceramic material are desirable.

The invention pertains to a ceramic material, as well as a method of making the ceramic material, wherein the specific ceramic is a silicon aluminum oxynitride (SiAlON) ceramic material. Even more particularly, the present invention pertains to a SiAlON material that includes in the starting powder mixture a non-binding liquid phase-forming additive that does not enter the alpha-SiAlON structure during sintering (which can be a selected rare earth element (e.g., lanthanum or cerium)) along with at least one rare earth element that will enter the alpha-SiAlON structure. Upon sintering the powder mixture, the non-binding liquid phase-forming additive, as well as the one rare earth additive, each forms a liquid phase.

During the sintering process, essentially no effective portion (i.e., essentially no detectable amount) of the non-binding liquid phase-forming additive forms a part of the alpha prime SiAlON phase (or the beta prime SiAlON phase) so that the liquid phase is maintained throughout the sintering process. More specifically, as shown by its formula, the beta prime SiAlON phase does not contain any non-binding liquid phase-forming additive(s). In regard to the alpha prime SiAlON phase, essentially no detectable amount of the non-binding liquid phase-forming additive(s) is present in the alpha prime SiAlON phase which means that an analysis of grains of the alpha prime SiAlON phase that have a diameter greater than or equal to about 2 micrometers using an EDS/SEM technique does not detect the presence of any of the non-binding liquid phase-forming additive(s).

The presence of the liquid phase enhances (i.e., increases) the formation of the alpha prime SiAlON phase wherein the alpha prime SiAlON phase includes the one rare earth element therein, i.e., the rare earth that has entered the alpha-SiAlON structure. These additives can comprises a number of compounds or elements (including selected rare earth elements) as described hereinafter. The specific rare earth elements that comprise a part of the alpha prime SiAlON phase are also discussed hereinafter.

Referring to the SiAlON ceramic material that contains an alpha prime-SiAlON phase and a beta prime-SiAlON phase, in the aspect of the invention the starting powder mixture contains at least two selected rare earth elements. The selected rare earth elements are selected from at least two groups of the following three groups of rare earth elements wherein Group I comprises La, Ce, Pr, Nd, Pm, Sm and Eu, and Group II comprises Gd, Tb, Dy and Ho, and Group III comprises Er, Tm, Yb and Lu. The alpha prime SiAlON phase has the formula $(RE)_x Si_{12-(m+n)} Al_{m+n} O_n N_{16-n}$ wherein RE is the contribution of at least one of the selected rare earth elements as discussed hereinabove excluding La and Ce. In this aspect of the invention, applicant prefers that one of the rare earth elements (e.g., lanthanum or cerium), which can be considered to be a non-binding liquid phase-forming rare earth element) forms a liquid phase during and through the sintering process. The liquid phase-forming rare earth element does not form a part of the alpha prime SiAlON phase so that there is essentially no detectable amount of the non-binding liquid phase-forming rare earth element in the alpha prime SiAlON phase. Through an x-ray diffraction technique, the value of x in the alpha prime SiAlON phase is equal to between a lower limit equal to about 0.10 and an upper limit equal to about 0.45. The value of m equals three times the value of x. The alpha prime SiAlON phase comprises generally equi-axed grains. Even though the above discussion mentions two rare earth elements, it should be appreciated that three of more rare earth elements may be-included in the starting powder mixture to produce the SiAlON ceramic body.

Referring to the SiAlON ceramic material that contains an alpha prime-SiAlON phase and a beta prime-SiAlON phase, in the aspect of the invention that contains the non-binding liquid-forming additive that is not a rare earth element and at least one rare earth element (and possibly two or more rare earth elements), the alpha prime phase has the formula $(RE)_x Si_{12-(m+n)} Al_{m+n} O_n N_{16-n}$ wherein RE is the rare earth element(s) contribution to the alpha prime SiAlON phase. The rare earth element(s) are selected according to the following parameters: (a) in the case of a single of the selected rare earth element, the selected rare earth element is selected from any of the following groups wherein Group I comprises Pr, Nd, Pm, Sm and Eu, and Group II comprises Gd, Tb, Dy and Ho, and Group III comprises Er, Tm, Yb and Lu; and (b) in the case of a plurality of the selected rare earth elements, the rare earth elements are selected from at least two groups of the following three groups of rare earth elements wherein Group IA comprises La, Ce, Pr, Nd, Pm, Sm and Eu, and Group II comprises Gd, Tb, Dy and Ho, and Group III comprises Er, Tm, Yb and Lu. Applicant expects that the values of x, m and n to remain essentially the same as described hereinabove. For this ceramic, the alpha prime SiAlON phase has generally equi-axed grains.

For either one of the ceramic bodies, the beta prime SiAlON phase has the formula $Si_{6-z} Al_z O_z N_{8-z}$. The preferred values for z range between greater than 0.3 and less than 1.5 wherein different metalcutting applications have different preferred ranges of the "z" value. For example, the preferred value for z ranges between greater than 0.3 and less than 0.6 for applications in which the invention is used as a cutting tool to machine cast iron. As another example, the preferred value for z ranges between greater than 0.7 and less than 1.5 for applications in which the invention is used as a cutting tool to machine a high temperature alloy (e.g., Inconel 718). The beta prime SiAlON phase comprises generally elongated grains. It is important that the starting powder mixture includes silicon nitride starting powder that contains either no or a low amount of (i.e., an amount that has a lower limit equal to zero weight percent and an upper limit equal to about 1.6 weight percent) beta silicon nitride. It is most preferred to use a silicon nitride starting powder that contains essentially zero weight percent beta silicon nitride.

The SiAlON ceramic material as discussed herein also contains one or more additional phases including an intergranular phase. The intergranular phase may comprise a glassy phase and an intergranular crystalline phase may sometimes also be present. The glassy phase is typically an amorphous phase that contains the rare earth elements, silicon, oxygen, aluminum and nitrogen.

Figure 1:
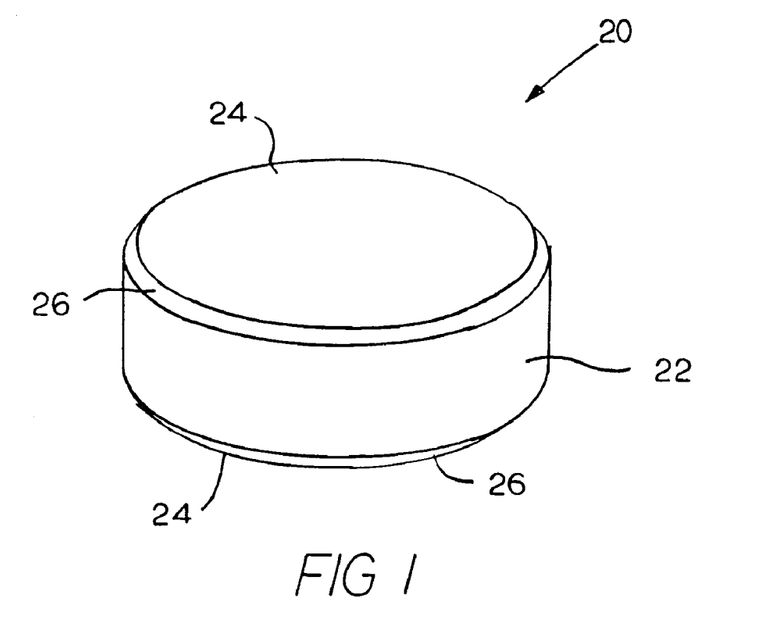
FIG. 1 is an isometric view of a first specific embodiment of a ceramic cutting insert that does not have a coating.

Referring to the drawings, FIG. 1 illustrates a RNG-T style of a cutting insert generally designated as 20. The cutting insert 20 has a flank surface 22 that is generally cylindrical in shape and a pair of opposite rake surfaces 24 that are each generally circular in shape. The flank surface 22 intersects with the rake surfaces 24 to define circular cutting edges 26. The cutting edge 26 has a bevel. Cutting insert 20 comprises the SiAlON ceramic material of the present invention.

In regard to the SiAlON ceramic material that comprises cutting insert 20, this SiAlON ceramic material is the kind of ceramic that is the subject matter of this invention. As is apparent, the SiAlON ceramic of this invention has different aspects and the ceramic material may be any one of these aspects. Further, although applicant does not intend to be limited by a preferred application, one preferred application for this ceramic cutting insert is in the high speed (e.g., a speed equal to or greater than about 1500 feet per minute turning of cast iron grades as workpiece materials.

Figure 2:
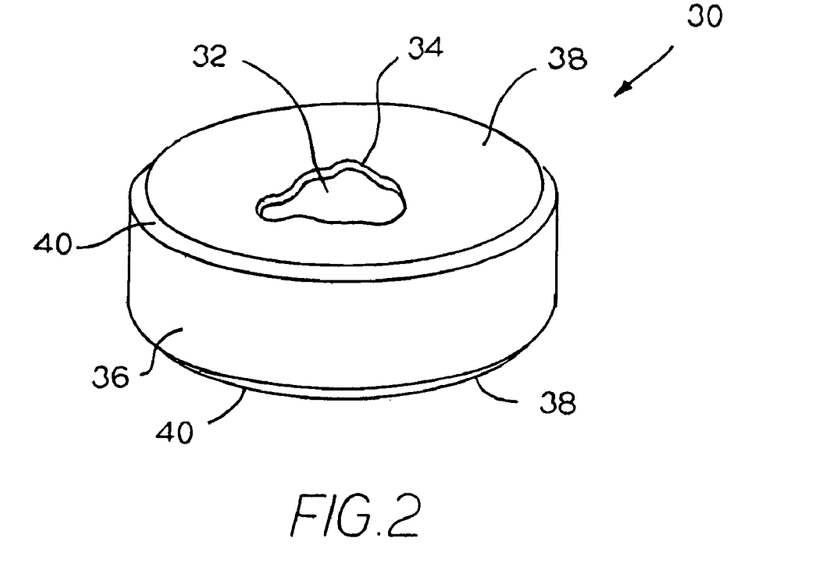
FIG. 2 is an isometric view of a second specific embodiment of a ceramic cutting insert wherein the cutting insert has a coating and a part of the coating has been removed to expose the substrate.

FIG. 2 illustrates a second specific embodiment of a cutting insert generally designated as 30. Cutting insert 30 has a substrate 32 and a coating 34. Cutting insert 30 has a generally cylindrical flank surface 36 and a pair of opposite generally circular rake surfaces 38. The flank surface 36 intersects the rake surfaces 38 to form circular cutting edges 40. Each cutting edge 40 has a bevel. The substrate 32 comprises the SiAlON material of the present invention. The material of substrate 32 can be the same as the material of uncoated cutting insert 20.

The process to make to the ceramic substrate of FIG. 2 is essentially the same as the process used to make the ceramic material of FIG. 1. In this regard, the pressed powder mixture is typically either batch sintered or belt sintered. The sintered substrate is optionally subjected to a hot isostatic pressing (HIPing) treatment. A pressure sintering process can also be used to densify the ceramic material. The details of certain processes are set forth hereinafter.

The coating may include a coating scheme of one or more layers applied by known techniques including chemical vapor deposition (CVD) and physical vapor deposition (PVD). The coating materials may include CVD-applied alumina applied to a depth of between 1 to 10 micrometers or to a more preferred depth of 3 to 5 micrometers. For example, the coating materials may include PVD-applied titanium aluminum nitride. The coating materials may include multi-layer coating schemes wherein it is preferable that the layer adjacent to the substrate comprise alumina. It is preferable if the titanium aluminum nitride coating has a composition that is aluminum rich.

Described below are some examples of the present invention. The examples discussed below comprise a SiAlON ceramic material that contains ytterbium and lanthanum. The ytterbium is a member of the Group III rare earths elements as characterized herein and the lanthanum is a member of the Group I rare earth elements as characterized herein. Even though these examples contain ytterbium and lanthanum, applicant does not intend to limit the scope of the invention by the composition of these examples.

One advantageous feature in the production of an alpha prime-beta prime SiAlON ceramic body is the ability to control (or at least exercise some control) over the composition and crystalline phase content of the resultant ceramic body. For example, applicant believes that the content of alpha prime SiAlON phase in the ceramic has an impact upon the properties of the ceramic, and especially those properties that allow the ceramic to function very well as an uncoated ceramic cutting insert or as the substrate of a coated ceramic cutting insert, as well as a good wear part.

Set forth below is applicant's understanding of why the alpha prime SiAlON content of such a SiAlON ceramic body can be controlled (at least to some extent). However, applicant does not intend to be restricted by the following discussion about applicant's understanding.

Applicant also believes that other additives that form a silicate liquid phase upon and through sintering, but do not form a part of the alpha prime SiAlON phase (i.e., non-binding additives), should also provide an advantageous result along the lines of the results provided by the lanthanum addition. In this regard, exemplary non-binding additives comprise BaO, MgO, SrO and $Sc_2O_3$ (these non-binding additives are good densification additives and they do not enter into the alpha-SiAlON phase) wherein these additives are added in amounts that range from a lower limit that equals about 0.1 weight percent of the starting powder mixture to an upper limit that equals about 1.0 weight percent of the starting powder mixture. In this aspect of the invention, the starting powder mixture includes an additive that forms a silicate liquid phase upon sintering wherein the additive does not form a part of the alpha prime SiAlON phase, i.e., a non-binding liquid phase-forming additive. The continued presence of the liquid phase enhances the formation of the alpha prime SiAlON phase so as to result in a SiAlON ceramic that has an increased content of the alpha prime SiAlON phase.

Although applicant does not intend to be restricted by the following theory thought to be at work in this invention, applicant believes that the advantages are obtained through the above selection parameters because the two or more rare earth elements are selected from different Groups I, II and/or III (as characterized above) will not form a solid solution. The ionic radii of the elements in these groups decrease across the series of rare earth elements, and as the difference between the ionic radius of the rare earth elements becomes greater these elements have an increased tendency to not enter the same crystalline structure. What this means is that during densification and cooling from the sintering temperature, the crystallizations rates are slowed down because the rare earth elements as selected from Groups I, II and/or III are attempting to crystallize in the intergranular regions.

Applicant also believes that the improved properties are enhanced by the fact that the SiAlON ceramic material is made from a starting powder mixture that includes silicon nitride starting powder that contains either no or a low amount of (i.e., an amount that has a lower limit equal to zero weight percent and an upper limit equal to about 1.6 weight percent) beta silicon nitride. In this regard, while applicant does not intend to be restricted by any particular theory, applicant believes that the beta silicon nitride particles are seeds for the nucleation and growth of the beta prime SiAlON grains. As the number of the beta silicon nitride particles increase the beta prime SiAlON grains impinge each other sooner so as to limit the formation of high aspect ratio beta prime SiAlON grains. In addition, as the number of the beta silicon nitride particles increases the content of the alpha prime SiAlON grains decreases. The use of fewer beta silicon nitride particles in the starting powder mixture results in a limited number of nucleation sites for the beta prime SiAlON grains to grow into the alpha prime SiAlON matrix during sintering. This results in beta prime SiAlON grains with a higher aspect ratio which causes a toughening of the alpha prima SiAlON phase matrix. This explanation is also found in U.S. Pat. No. 6,693,054 to Yeckley that is assigned to the assignee of the present patent application.

As described below, the starting silicon nitride powder for these examples does not contain any beta silicon nitride. However, the fact that the examples use a silicon nitride starting powder that does not contain any beta-silicon nitride is not intended to restrict the scope of the invention. As set forth herein, the beta-silicon nitride content of the silicon nitride powder can have a lower limit equal to zero weight percent and an upper limit equal to about 1.6 weight percent of the silicon nitride powder.

Referring now to the specific examples, Table 1 sets forth starting powder compositions (in weight percent of the total starting powder mixture) of Batch Nos. 2651A through 2651D and Batch Nos. 2650C through 2650D. The starting powder mixture for each one contained silicon nitride powder wherein zero weight percent of the starting silicon nitride powder comprised beta-silicon nitride powder and the balance (except for impurities) comprised alpha-silicon nitride.

TABLE 1

Starting Powder Compositions for Batch Nos. 2651A–2651D and 2650C–2650D [in weight percent] of the Starting Powder Mixture

| Batch No./Compositional ID | Silicon Nitride [UBE SNE-03] | Aluminum Nitride [Starck Grade A] | Aluminum Oxide [Ceralox HPA-0.5] | Ytterbia (ytterbium oxide) [Molycorp] | Lanthania (lanthanum oxide) [Molycorp] |
|---|---|---|---|---|---|
| 2651A/ab13(37)14 | 80.80 | 5.20 | 5.80 | 6.97 | 1.01 |
| 2651B/ab13(37)14 | 80.80 | 5.20 | 5.80 | 5.74 | 2.03 |
| 2651C/ab24(32)11 | 71.02 | 10.25 | 12.70 | 5.26 | 0.77 |
| 2651D/ab24(32)11 | 71.17 | 10.25 | 12.70 | 4.34 | 1.54 |
| 2650C/ab7(37)9 | 88.55 | 4.00 | 2.30 | 4.51 | 0.64 |
| 2650D/ab7(37)9 | 88.55 | 4.00 | 2.30 | 3.87 | 1.28 |

The starting powders are briefly described as follows. The silicon nitride powders was made by UBE Industries, Inc. and sold under the designation SNE03. This silicon nitride powder did not contain any beta silicon nitride, but instead, comprised about one hundred percent alpha silicon nitride, except for impurities.

The aluminum nitride starting powder was supplied by Herman C. Starck of New York, N.Y. (United States of America) under the designation Grade A. The aluminum oxide starting powder was supplied by Sasol North America, Inc., Ceralox Division of Tucson, Ariz. (United States of America) under the designation HPA-0.5 (which contains a deliberate addition of 0.5 weight percent magnesia). The ytterbium oxide starting powder and the lanthanum oxide starting powder were supplied by Molycorp Corporation of Mountain Pass, Cali. (United States of America).

Referring to the method to produce the ceramic material, for each one of the above Batches set out in Table 1, the starting powder mixture was milled for a time of between about 8 hours and about 16 hours with isopropanol and using an alpha' SiAlON-beta' SiAlON media to form a slurry. After completion of the milling, the slurry was discharged through a 400 mesh screen and then vacuum dried to form a dry powder. The dry powder was then fitzmilled and pellitized using a fluid bed process. Rosin and Carbowax 400 were added as binders during the fluidization process. The pellitized material (dry powder and the binder material) was then dry pressed into green compacts with a density of between about 2 to about 2.15 grams per cubic centimeter. The binder was then removed by an air burnout cycle that had a maximum temperature of about 875 degrees Centigrade.

The compacts were then sintered in one of a number of ways as described below; namely, the compacts were either belt sintered or batch sintered. In regard to the batch sintering, the process comprised placing compacts in a graphite box. The compacts were buried in an 80 weight percent silicon nitride-20 weight percent boron nitride powder mixture. The compacts were sintered under one atmosphere of nitrogen for duration equal to 60 minutes at a temperature equal to 1825° C.

In regard to the belt sintering process, the compacts were loaded into BN (boron nitride) saggers that had dimensions of 4 inches×8 inches×1.25 inches. There were three layers of compacts per box with 55 compacts per layer for the RNG43 and CNGA433 style cutting inserts. The BN saggers were stacked two high and placed on the belt of a continuous sinter furnace. The furnace had four independently controlled heating zones wherein each heating zone was 12 inches long. The ramp rate for the heat up was about 150 degrees Centigrade per minute. The heating zones were held at the temperatures set forth hereinafter: the first heating zone was at a temperature equal to about 1550° C., the second heating zone was at a temperature equal to about 1650° C., the third heating zone was held at a temperature equal to about 1765° C., and the fourth heating zone was held at a temperature equal to about 1765° C. The compacts stayed within each zone for about 30 minutes. The resultant body was a belt-sintered ceramic body. The furnace is along the lines of the furnace described in U.S. Pat. No. 5,648,042 to Miller, Jr. entitled HIGH TEMPERATURE BELT FURNACE APPARATUS AND METHOD OF USING THE SAME, except that the furnace used in these examples had four heating zones.

In regard to belt sintering in general, the use of a belt furnace to sinter a compact is disclosed in Wittmer et al., "Economic Comparison of Continuous and Batch Sintering of Silicon Nitride", *American Ceramic Society Bulletin*, Vol. 72, No. 6 (1993), pp. 129-137; Wittmer et al., Comparison of Continuous Sintering to Batch Sintering of $Si_3N_4$", *Ceramic Bulletin*, Vol. 70, No. 9 (1991) pp. 1519-1527; and Wittmer et al., "Continuous Sintering of $Si_3N_4$ in a Controlled Atmosphere Belt Furnace". Published PCT Patent Application No. PCT/US99/14231 with an International Filing Date of Jun. 23, 1999 for a CERAMIC AND PROCESS FOR THE CONTINUOUS SINTERING THEREOF discloses the continuous sintering in a belt furnace of a ceramic wherein the sintered product includes an alpha'-SiAlON phase and a beta'-SiAlON phase.

The specific processes identified in the tables below are now described below.

Process E572 and Process E573 each comprise a batch sintering process per the above-recited parameters; namely, placing compacts in a graphite box in which the compacts were buried in an 80 weight percent silicon nitride-20 weight percent boron nitride powder mixture. The compacts were then sintered under one atmosphere of nitrogen for duration equal to 60 minutes at a temperature equal to 1825° C.

Process BSWK1004 comprises: a belt sintering process along the lines as described above; namely, the furnace had four temperature zones wherein the zones had the following temperatures: the first heating zone was at a temperature equal to about 1550° C., the second heating zone was at a temperature equal to about 1650° C., the third heating zone was held at a temperature equal to about 1765° C., and the fourth heating zone was held at a temperature equal to about 1765° C. The compacts were maintained in each heating zone for about 30 minutes.

Process Kz533, Process Kz534 and Process Kz535 each comprise a hot isostatic pressing (HIP) cycle that comprises pressing at a temperature equal to 1800° C. for a duration of 30 minutes under a gas pressure equal to between about 10,000 pounds per square inch (psi) and about 20,000 psi. These HIP cycles occur after sintering so that they are performed on a sintered substrate wherein the substrate may be batch-sintered or belt-sintered.

Referring now the properties of the specific compositions of the examples, Table 2 below sets forth the density for the SiAlON compositions set out in Table 1 wherein for most of the examples, Table 2 reports two density measurements. However, in some cases, only one density measurement is reported and the absence of a second measurement is shown by a dash. The density is reported in grams per cubic centimeter (g/cm$^3$). Each example listed in Table 2 was processed according to the process that is identified along with the example

TABLE 2

Density (g/cm$^3$) of SiAlON Compositions in Batch Nos. 2651A–2651D and 2650C–2650D

| Batch/Process | E572 [Batch Sintered] | E573 [Batch Sintered] | BSWK 1004 [Belt Sintered] | Kz533 [Batch Sintered-HIPped] | Kz535 [Belt Sintered-HIPped] |
|---|---|---|---|---|---|
| 2651A | 3.315 | 3.313 | 3.3293 | 3.338 | 3.338 |
|  | 3.319 | 3.306 | 3.3283 | 3.339 | 3.338 |
| 2651B | 3.297 | 3.287 | 3.3141 | 3.327 | 3.329 |
|  | 3.303 | 3.287 | 3.3117 | 3.328 | 3.331 |
| 2651C | 3.275 | 3.261 | 3.2843 | 3.291 | 3.291 |
|  | 3.27 | 3.251 | 3.2843 | 3.292 | 3.293 |
| 2651D | 3.258 | 3.192 | 3.2781 | 3.289 | 3.289 |
|  | 3.206 | 3.184 | 3.2764 | — | 3.289 |
| 2650C | 3.215 | 3.194 | 3.2557 | 3.281 | 3.289 |
|  | 3.242 | 3.22 | — | 3.282 | — |
| 2650D | 3.204 | 3.197 | 3.241 | 3.278 | 3.286 |
|  | 3.239 | 3.222 | — | — | — |

Table 3 sets out the phases present for the SiAlON compositions set out in Table 1. Table 3 also sets forth the specific process used to produce the SiAlON ceramic body.

The phases as set forth in Table 3 below were determined as described below. The values set forth for each one of the crystalline phases, i.e., the Yb$_4$SiAlO$_8$N crystalline phase and the SiAl$_5$O crystalline phase, is the relative intensity of the peak for the particular crystalline phase as compared to the major peak, i.e., the peak for beta prime SiAlON phase.

In regard to the determination of the weight percent of alpha'-SiAlON phase, the weight percent of the alpha'-SiAlON phase is calculated pursuant to the following relationship:

Weight Percent alpha'-SiAlON=$(1.72I_{\alpha'\text{-}SiAlON} \div (1.72I_{\alpha'\text{-}SiAlON}+I_{\beta'\text{-}SiAlON}+0.23I_{Si}+0.48I_{SiC}))\times 100$ percent Similarly, the weight percent of the beta'-SiAlON phase is calculated pursuant to the following relationship:

Weight Percent beta'-SiAlON=$(I_{\beta'\text{-}SiAlON} \div (1.72I_{\alpha'\text{-}SiAlON}+I_{\beta'\text{-}SiAlON}+0.23I_{Si}+0.48I_{SiC}))\times 100$ percent For the above relationships the following exists:

$I_{\alpha'\text{-}SiAlON}$=measured x-ray diffraction of the (201) reflection of alpha'-SiAlON $I_{\beta'\text{-}SiAlON}$=measured x-ray diffraction intensity of the (200) reflection of beta'-SiAlON $I_{Si}$=measured x-ray diffraction intensity of the (111) reflection of silicon metal $I_{SiC}$=measured x-ray diffraction intensity of the (015) reflection of silicon carbide (6h)

This method is adopted from the method described in the following article: Z. Mencik, M. A. Short, and R. C. Peters, "Quantitative Phase Analysis of Synthetic Silicon Nitride by X-ray Diffraction", Advances in X-ray Analysis, Volume 23, 1979, pages 375–379.

These diffracted x-ray intensities were measured using a Bragg-Brentano focusing optics diffractometer operated at 45 KV and 40 MA. Incident x-ray optics includes a ½ degree divergence slit and 1-degree anti-scatter slit. Receiving optics included a 0.15 mm receiving slit; a curved graphite monochromer, and a sealed detector. Diffraction data was collected from 10 to 90 degrees 2θ in step mode and analyzed using computerized methods.

The collected diffraction data was first corrected by fitting a polynomial background function. The background corrected data was analyzed using profile-fitting techniques to determine peak positions and intensity for the stated diffracted reflections.

In regard to the determination of the relative intensity of the Yb$_4$SiAlO$_8$N crystalline phase and the SiAl$_5$O crystalline phase, the relative intensity of the Yb$_4$SiAlO$_8$N crystalline phase and the SiAl$_5$O crystalline phase is calculated from the following:

Relative Intensity of the Yb$_4$SiAlO$_8$N Phase=$I_{Yb4SiAlO8N} \div I_{Highest}$ Relative Intensity of the SiAl$_5$O Phase=$I_{SiAl5O} \div I_{Highest}$ For the above relationships, the following exists:

$I_{Yb4SiAlO8N}$=measured x-ray diffraction intensity of the (211) reflection of Yb$_4$SiAlO$_8$N $I_{SiAl5O}$=measured x-ray diffraction intensity of the (201) reflection of SiA$_5$O $I_{Highest}$=measured x-ray intensity of highest peak detected (typically beta'-SiAlON)

The diffraction setup was identical to the diffraction setup to determine the weight percent of alpha'-SiAlON and beta'-SiAlON.

In those compositions that contain lanthanum, the lanthanum is contained in the amorphous phase. In those compositions that contain cerium, the cerium is contained in the amorphous phase.

TABLE 3

Phases Present in SiAlON Compositions in Batch Nos. 2651A–2651D and 2650C–2650D

| Composition I.D. | Sinter I.D. | Type of Process | α'SiAlON w/o | Yb₄SiAlO₈N RI | SiAl₅O RI |
|---|---|---|---|---|---|
| 2651A | BSWK 1004 | Belt Sinter | 31.3 | — | — |
| 2651A | E572 | Batch Sinter | 33.3 | — | — |
| 2651B | BSWK 1004 | Belt Sinter | 32.4 | — | — |
| 2651B | E572 | Batch Sinter | 34.7 | — | — |
| 2651C | BSWK 1004 | Belt Sinter | 18.1 | — | 5 |
| 2651C | E572 | Batch Sinter | 14.6 | — | 4.2 |
| 2651D | BSWK 1004 | Belt Sinter | 2.6 | — | 6 |
| 2651D | E572 | Batch Sinter | 6.7 | — | 5.9 |
| 2650C | | | | | |
| 2650C | E572 | Batch Sinter | 61.1 | — | — |
| 2650D | BSWK 1004 | Belt Sinter | 50.9 | — | — |
| 2650D | E572 | Batch Sinter | 70 | — | — |

Table 4 sets out the phases present and the physical properties for the SiAlON compositions set out in Table 1. Table 4 sets forth the alpha prime SiAlON phase (in weight percent of the two-phase composite, i.e., the alpha prime SiAlON phase and beta prime SiAlON phase), the relative intensity (R.I.) of the intercrystalline phase Yb₄SiAlO₈N phase and the relative intensity (R.I.) of the intercrystalline phase SiAl₅O₂N₅. The alpha prime SiAlON content was determined according to the technique sets forth above. The relative intensity (R.I.) of each crystalline phase was determined according to the technique set forth above.

Table 4 also sets forth the process used to produce the SiAlON ceramic body under the heading "Sinter HIP". In regard to the measurement of the physical properties, the Vickers hardness (Hvn) was measured using a 18.5 kilogram load and is set forth in gigapacals. The fracture toughness ($K_{IC}$) was measured on a polished surface employing a Palmqvist indentation technique using a 18.5 kg load on a Vickers indentor per the article by Evans and Charles, "Fracture Toughness Determination by Indentation", J. American Ceramic Society, Vol. 59, Nos. 7-8, pages 371-372.

TABLE 4

Phases Present and Physical Properties of SiAlON Compositions in Batch Nos. 2651A–2651D and 2650A–2650D

| Composition/ Property | Sinter HIP Process | Alpha SiAlON in weight percent | R.I. Yb₄SiAlO₈N | R.I. SiAl₅O₂N₅ | Hvn GPa | Std Dev. | KIC MPa·m^(1/2) | Std Dev. |
|---|---|---|---|---|---|---|---|---|
| 2651A | E573 Kz533 | 27.1 | — | — | 17.65 | 0.16 | 7.03 | 0.09 |
| 2651A | BSWK Kz534 | 28.4 | — | — | 17.29 | 0.37 | 7.27 | 0.13 |
| 2651B | E573 Kz533 | 29.6 | — | — | 17.57 | 0.23 | 6.92 | 0.19 |
| 2651B | BSWK Kz534 | 26.9 | — | — | 17.43 | 0.28 | 7.27 | 0.17 |
| 2651C | E573 Kz533 | 7.1 | — | 4.5 | 16.69 | 0.14 | 5.67 | 0.08 |
| 2651C | BSWK Kz534 | 26.9 | — | 5.2 | 16.54 | 0.21 | 5.48 | 0.24 |
| 2651D | E573 Kz533 | 2.8 | — | 5.6 | 16.08 | 0.26 | 5.76 | 0.13 |
| 2651D | BSWK Kz534 | 2.3 | — | 5.9 | 17.37 | 0.39 | 4.49 | 0.29 |
| 2650C | E573 Kz533 | 51.3 | — | — | 19.55 | 0.47 | 6.88 | 0.18 |
| 2650C | BSWK1004 Kz535 | 38.7 | — | — | 18.17 | 0.38 | 7.42 | 0.22 |
| 2650D | E573 Kz533 | 59.4 | — | — | 19.41 | 0.28 | 6.82 | 0.07 |
| 2650D | BSWK1004 Kz535 | 41.8 | — | — | 18.57 | 0.41 | 7.04 | 0.14 |

Figure 3:
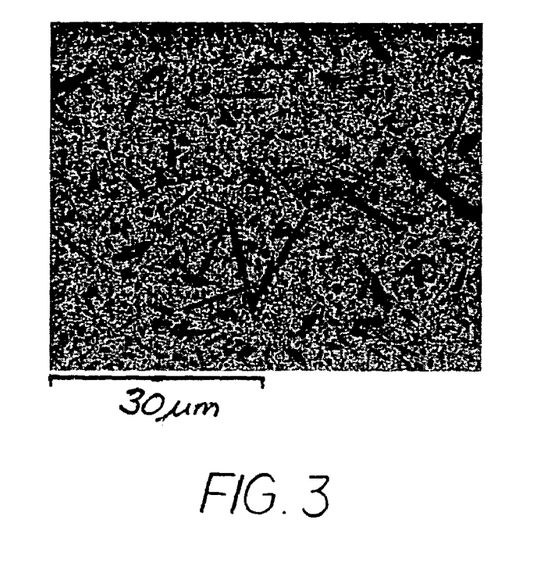
FIG. 3 is a photomicrograph showing the microstructure of a SiAlON material that contains only ytterbium as the rare earth additive (Comparative Example ab7(39)7 as described hereinafter) wherein the process comprised a belt sintering-hot isostatic pressing (HIP) technique, and the scale of the photomicrograph is 30 micrometers.

FIG. 3 is a photomicrograph that shows the microstructure of prior art SiAlON ceramic material (ab8378) that contains only ytterbium as an additive. The composition of the starting powder mixture is set forth as follows: 88.25 weight percent silicon nitride (zero weight percent of the silicon nitride powder comprises beta silicon nitride), 4.0 weight percent aluminum nitride, 2.6 weight percent aluminum oxide, and 5.15 ytterbium oxide. The starting powder mixture was milled and pressed into a green compact that was belt-sintered and hot isostatic pressed according to the following parameters. For the belt-sintering there were four heating zones held at the following temperatures: the first heating zone was at a temperature equal to about 1550° C., the second heating zone was at a temperature equal to about 1650° C., the third heating zone was held at a temperature equal to about 1765° C., and the fourth heating zone was held at a temperature equal to about 1765° C. The compacts were maintained in each heating zone for about 30 minutes. For the hot isostatic pressing step, the belt-sintered ceramic body was hot isostatic pressed at a temperature equal to 1800° C. for a duration of 30 minutes under a gas pressure equal to between about 10,000 pounds per square inch (psi) and about 20,000 psi.

In regard to the microstructure of the ceramic body shown in FIG. 3, the dark grains are grains of the beta prime SiAlON phase, the medium gray grains are grains of the alpha prime SiAlON phase, and the bright phase is the intergranular phase. It should be noted that the dark grains have an aspect ratio.

Figure 4:
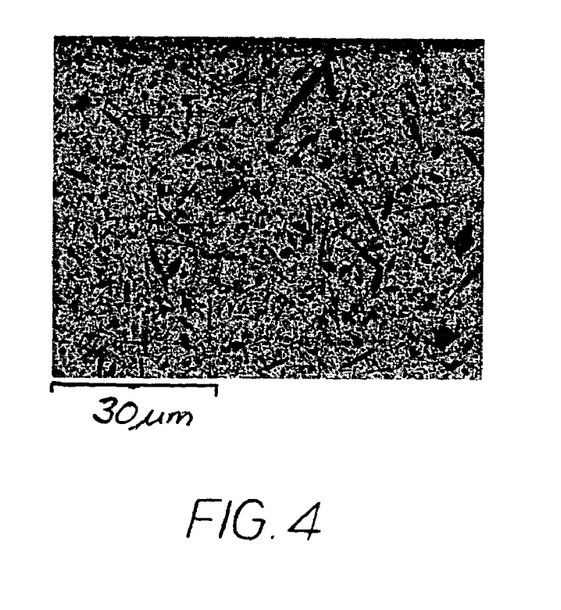
FIG. 4 is a photomicrograph showing the microstructure of a SiAlON material (Composition 2650C (Compositional ID ab7(37)7) as described hereinafter) that contains ytterbium and lanthanum as the rare earth additives wherein the process to produce the ceramic comprised a belt sintering-hot isostatic pressing technique as described hereinafter, and the scale of the photomicrograph is 30 micrometers.

FIG. 4 is a photomicrograph that shows the microstructure of an inventive SiAlON ceramic material that comprises Example 2650C (Compositional ID ab7(37)9) described hereinabove. In FIG. 4, the dark grains are grains of the beta prime SiAlON phase, the medium gray grains are grains of the alpha prime SiAlON phase, and the bright phase is the intergranular phase. The ceramic body was made by the belt-sintering process described above and the hot isostatic pressing process described above. The microstructure shown in FIG. 4 reveals that the grain size of the alpha prime SiAlON phase is smaller than the grain size of the alpha primes SiAlON phase in the ceramic body of FIG. 3.

Figure 5:
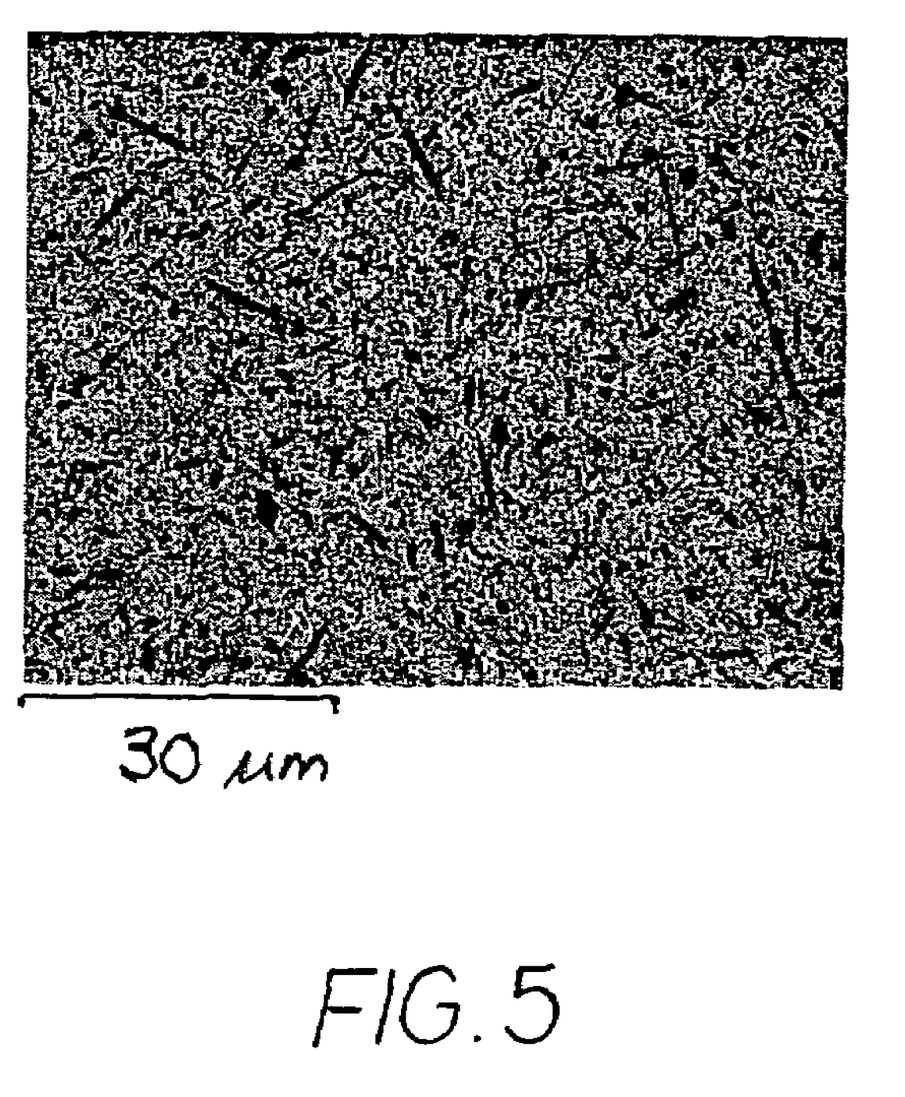
FIG. 5 is a photomicrograph showing the microstructure of a SiAlON material (Composition 2650C (Compositional ID ab7(37)7) as described hereinafter) that contains ytterbium and lanthanum wherein the process to produce the ceramic comprised a batch sintering-hot isostatic pressing technique as described hereinafter, and the scale of the photomicrograph is 30 micrometers.

FIG. 5 is a photomicrograph that shows the microstructure of an inventive SiAlON ceramic material that comprises Example 2650C described hereinabove. In FIG. 5, the dark grains are grains of the beta prime SiAlON phase, the medium gray grains are grains of the alpha prime SiAlON phase, and the bright phase is the intergranular phase. The ceramic body was made by the batch-sintering process described above and the hot isostatic pressing process described above. The microstructure shown in FIG. 5 reveals that the grain size of the alpha prime SiAlON phase is smaller than the grain size of the alpha prime SiAlON phase in the ceramic body of FIG. 4.

Overall, a review of these photomicrographs shows that finer-grained microstructures are preferred for wear applications and would expect to exhibit higher strengths than materials that do not have as a fine-grained microstructure.

Applicant has believes that the amount of the beta silicon nitride in the starting silicon nitride powder has an impact upon the amount of the alpha prime SiAlON phase present in the as-sintered microstructure. This aspect is described in more detail in U.S. Pat. No. 6,693,054 to Yeckley mentioned above. More specifically, as the amount of beta silicon nitride in the starting silicon nitride powder increases, the amount of alpha prime SiAlON phase in the as-sintered microstructure decreases. Applicant further believes that the higher toughness of the SiAlON ceramic body is obtained when the silicon nitride starting powder has either no low contains either no or a low amount of (i.e., an amount that has a lower limit equal to zero weight percent and an upper limit equal to about 1.6 weight percent) beta silicon nitride. In regard to each one of the Batch Nos.2561A-2651D and 2650C-2650D, the content of the beta-silicon nitride in the starting silicon nitride powder mixture was zero weight percent and the content of the alpha-silicon nitride in the starting silicon nitride powder was about one hundred weight percent (keeping in mind that there may be some impurities).

The amount of beta silicon nitride in the starting powder mixture may be controlled in one of two ways. One way is to blend predetermined amounts of two or more silicon nitride powders wherein the alpha and beta contents of each powder is known so as to achieve a silicon nitride powder of a known beta content. The other way is to take 100 percent alpha silicon nitride powder and add a selected amount of 100 percent beta silicon nitride powder to it to achieve a silicon nitride powder of a known beta content. This latter way facilitates control of the particle size of the beta silicon nitride component.

Referring to the impact of the beta silicon nitride content of the starting silicon nitride powder, as described hereinabove, although applicant does not intend to be restricted by any particular theory, applicant believes that the beta silicon nitride particles are seeds for the nucleation and growth of the beta prime SiAlON grains. As the number of the beta silicon nitride particles increases, the beta prime SiAlON grains impinge each other sooner so as to limit the formation of high aspect ratio beta prime SiAlON grains. In addition, as the number of the beta silicon nitride particles increase, the content of the alpha prime SiAlON grains decreases. The use of fewer beta silicon nitride particles in the starting powder mixture results in a limited number of nucleation sites for the beta prime SiAlON grains to grow into the alpha prime SiAlON matrix during sintering. This results in beta prime SiAlON grains with a higher aspect ratio which causes a toughening of the alpha prima SiAlON phase matrix.

Applicant believes that the lanthanum (preferably added in the form of lanthanum oxide) forms a liquid phase and also does not become a part of the alpha prime SiAlON phase. In other words, the alpha prime SiAlON, which has the formula $RE_xSi_{12-(m+n)}Al_{m+n}O_nN_{16-n}$ where RE is the rare earth contribution (which could be a contribution of one or more are earths excluding La and Ce), does not contain essentially any detectable amount of lanthanum-so that RE in the formula essentially cannot include lanthanum. Because the lanthanum does not form an alpha prime SiAlON phase (or at least essentially no detectable amount of lanthanum is in the alpha prime SiAlON phase) the liquid phase exists at the sintering temperature and through the sintering process because the alpha prime SiAlON phase (or the beta prime SiAlON phase) does not consume the lanthanum contained in the liquid phase. Applicant believes that the presence of the liquid phase during the early portion of the sintering process enhances the formation of the alpha prime SiAlON phase wherein the other rare earth elements (preferably added to the starting powder mixture in the form of their oxides) become a part of the alpha prime SiAlON phase (i.e., the one or more other rare earth elements comprise RE in the above formula). Applicant believes that the use of cerium would also cause formation of a liquid phase wherein cerium would not become a part of the alpha prime SiAlON phase.

Figure 6:
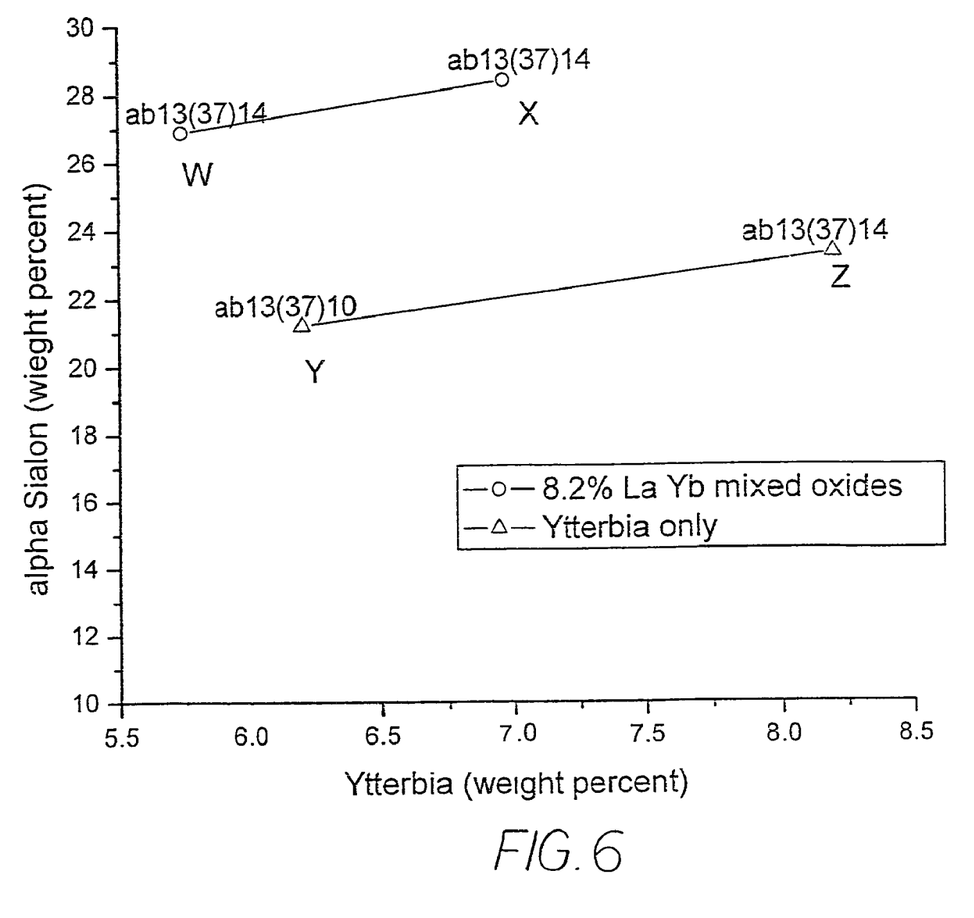
FIG. 6 is a graph that plots the ytterbium content (in weight percent) in the starting powder mixture against the content (in weight percent) of the alpha prime SiAlON phase in the two-phase composite (i.e., alpha prime SiAlON phase and the beta prime SiAlON phase) for four compositions identified with the letters W, X, Y, and Z.

FIG. 6 is a graph that represents the content (in weight percent) of the alpha prime SiAlON phase as a function of the ytterbia (i.e., ytterbium oxide) addition to the starting powder mixture of different compositions. These compositions are represented by the letters W, X, Y, and Z. Table 5 below sets forth the composition, as well as the Composition ID, of the starting powder mixture, as well as the content in weight percent of the alpha prime SiAlON phase.

TABLE 5

Compositions [weight percent] of Starting Powder Mixtures and Alpha Prime SiAlON phase Content of Examples W through Z of FIG. 6

| Example | Silicon Nitride | Aluminum Nitride | Aluminum Oxide | Ytterbium Oxide | Lanthanum Oxide | Alpha prime SiAlON (wt. %) |
|---|---|---|---|---|---|---|
| W [ab13(37)14/2651B] | 80.80 | 5.20 | 5.80 | 5.74 | 2.03 | |
| X [ab13(37)14/2651A] | 80.80 | 5.20 | 5.80 | 6.97 | 1.01 | |
| Y [ab13(37)10] | 82.10 | 5.20 | 6.50 | 6.20 | — | |
| Z [ab13(37)14] | 80.80 | 5.20 | 5.80 | 8.20 | — | |

As is apparent from the Table 5 above, Examples Y and Z (shown by the triangles) contain only ytterbium (in the form of ytterbia in the starting powder mixture) as the sole earth element. Examples W and X (shown by the circles) contains ytterbium and lanthanum (in the form of ytterbia and lanthanum oxide in the starting powder mixture).

Still referring to the ceramic bodies represented in FIG. 6, one sees that the presence of lanthanum as a rare earth element, along with ytterbium, impacts the alpha prime SiAlON phase content in the ceramic body. As shown by a comparison of the compositions represented by points W, X and Z in FIG. 6, even though the values of "x", "y" and "z" of the Composition ID (i.e., abx(y)z) are the same, the presence of lanthanum results in a ceramic that contains a greater alpha prime SiAlON content. Further, a comparison of the ytterbium contents for the ceramics represented by Points W through Z in FIG. 6 shows that even if the ytterbium content is lower (i.e., compare Point W at 5.74 weight percent against Point Y at 6.20 weight percent), the alpha prime SiAlON phase content is still higher when lanthanum is present. Even if the ytterbium content is greater (i.e., compare Point X at 6.97 weight percent against Point Y at 6.20 weight percent), the alpha prime SiAlON phase content is still greater when lanthanum is present.

Referring to FIG. 7, all condensed phases that can form between silicon nitride, alumina, aluminum oxide, silica can be represented on a reciprocal salt diagram (see L. J. Gauckler and G. Petzow, Representation of Multicomponent Silicon Nitride Based Systems, Nitrogen Ceramics, Nordoff International, 1977 pages 41-60). When a rare earth is included as the densification additive, the quaternary diagram depicts the phases that form. The units in such a quaternary diagram are equivalents.

The equivalents are calculated from the gram-atoms using the following formulas: $4 \cdot Si/(4 \cdot Si + 3 \cdot Al + 3 \cdot RE) = Si$ equivalents (Sieq). The same is done for Al and RE as follows: $3 \cdot Al/(4 \cdot Si + 3 \cdot Al + 3 \cdot RE) = Al$ equivalents (Aleq); and $3 \cdot RE/(4 \cdot Si + 3 \cdot Al + 3 \cdot RE) = RE$ equivalents (REeq). The nitrogen equivalents are calculated as $3 \cdot N/(2 \cdot O + 3 \cdot N)$, the same is done for the oxygen as follows: $2 \cdot O/(2 \cdot O + 3 \cdot N)$.

The starting powder compositions in the examples set forth herein are given as weight percent. The gram-atoms are calculated from the weight percent of the constituents of the starting powder mixture. The calculation assumes the silicon nitride has 2.2 weight percent silica due to surface oxygen and that the aluminum nitride contains 2.55 weight percent alumina due to surface oxygen. The composition nomenclature in this patent is calculated from the equivalents.

The composition ID consists of abx(y)z where "ab" refers to a ceramic material that contains alpha prime SiAlON phase and beta prime SiAlON phase. In the composition ID, x is the distance from the silicon nitride corner to the composition point on the base plane. All compositions contain a rare earth so the composition is above the base plane. The first coordinate of the point location on the base plane is determined from; $1-(REeq \cdot COS(60)+Sieq)$. The second coordinate of the point location on the base plane is the Oeq. The distance "x" is determined using the Pythagorean theorem. The result is multiplied by 100 and rounded to the nearest one. In the case of Point D, the line identified as L represents the distance "x" (in the Composition Idabx(y)z) of Point D.

The number "y" is the angle to the nearest degree with the Silicon Nitride-AlN axis determined as the $\arcsin(Oeq/x)$. In the case of Point D, the angle M is the angle with respect to the silicon nitride-AlN axis.

The last number, z is the height above the base plane and represents the rare earth content. The height is calculated from $REeq \cdot SIN(60) \cdot 1000$.

The beta SiAlON phase line makes a 33 degree angle (see angle P) with silicon nitride-AlN axis. What this means is that a composition with a "y" value of greater than 33 degrees is on the oxygen side of the beta SiAlON phase line and a composition with a "y" value less than 33 degrees is on the nitrogen side between the beta prime SiAlON phase and alpha prime SiAlON phase.

By using a Composition ID (i.e., abx(y)z) to represent the composition one can see that the content (in weight percent) of alpha prime SiAlON phase of the ceramic body changes as the rare earth content increases at a fixed value of x and y.

The Composition ID is one way that can be used to define the compositional region of interest for this invention. The compositional region is a volume within the quaternary diagram. The first two numbers define an area on the base plane. A line segment on a vector defines each border (or boundary) of the compositional area. The upper border (line Q) falls on a vector at an angle (R) of 37 degrees with respect to the silicon nitride-AlN axis. The lower corner (Point A) is at a length equal to 7 and the upper corner ((Point B) is equal to 23. The lower border (line S) has an angle (T) equal to 25 degrees with respect to the silicon nitride-AlN axis and has the same lengths as the upper border (line Q). Because the SiAlONs contain a rare earth, the compositions are located above the base plane. The height above this base plane ranges from 7 to 16. Points B and C are connected by a border (line V). The compositional space of interest is shown by the area bounded by the borders (Q, S, U, V) and defined by Points A, B, C and D in FIG. 7. This area is a projection on the base plane so that the actual compositions are located above this plane because they contain a rare earth(s) component.

It is apparent that the present invention provides a ceramic material, and in particular a SiAlON material, that exhibits improved properties so that this material is suitable for use as a cutting insert for metal cutting application, as well as use as a wear part (e.g., plunger rods for pumps, plunger ball blanks, down hole pump check valve blanks, bushings, blast nozzles, and other wear and impact applications).

The patents, patent applications, and other documents identified herein are hereby incorporated by reference herein.

Other embodiments of the invention will be apparent to those skilled in the art from a consideration of the specification of the practice of the invention disclosed herein. It is intended that the specification and examples be considered as illustrative only, and that the true spirit and scope of the invention being indicated by the following claims.

What is claimed is:

1. A method of making a SiAlON ceramic body that comprises a two phase composite comprising an alpha prime SiAlON phase and a beta prime SiAlON phase, the method comprising the steps of:
   providing a starting powder mixture that comprises at least about 70 weight percent silicon nitride powder and one or more other powders that provide aluminum, oxygen, nitrogen, and at least two selected rare earth elements to the SiAlON ceramic body wherein the rare earth elements are selected from at least two groups of the following three groups of rare earth elements wherein Group I comprises La, Ce, Pr, Nd, Pm, Sm and Eu, and Group II comprises Gd, Tb, Dy and Ho, and Group III comprises Er, Tm, Yb and Lu, wherein the silicon nitride powder in the starting powder mixture contains essentially zero weight percent beta silicon nitride; and
   consolidating the starting powder mixture to form a ceramic body comprising a two phase composite comprising an alpha prime SiAlON phase and a beta prime SiAlON phase, and the alpha prime SiAlON phase containing one or more of the selected rare earth elements excluding La and Ce, and the ceramic body having a composition falling within the area bounded by the trapezoid defined by points A, B, C and D in FIG. 7.

2. The method of claim 1 wherein the consolidating step includes a sintering step.

3. The method of claim 2 wherein the consolidating step further includes a hot isostatic pressing step that follows the sintering step.

4. A method of making a SiAlON ceramic body that comprises a two phase composite comprising an alpha prime SiAlON chase and a beta prime SiAlON phase, the method comprising the steps of:
   providing a starting powder mixture that comprises at least about 70 weight percent silicon nitride powder and one or more other powders that provide aluminum, oxygen, nitrogen, and at least two selected rare earth elements to the SiAlON ceramic body wherein the rare earth elements are selected from at least two groups of the following three groups of rare earth elements wherein Group I comprises La, Ce, Pr, Nd, Pm, Sm and Eu, and Group II comprises Gd, Tb, Dy and Ho, and Group III comprises Er, Tm, Yb and Lu, and wherein the silicon nitride powder in the starting powder mixture has a beta-silicon nitride content with a lower limit equal to zero weight percent and an upper limit equal to about 1.6 weight percent of the silicon nitride powder; and
   consolidating the starting powder mixture to form a ceramic body comprising a two phase composite comprising an alpha prime SiAlON phase and a beta prime SiAlON phase, and the alpha prime SiAlON phase containing one or more of the selected rare earth elements excluding La and Ce, and the ceramic body having a composition falling within the area bounded by the trapezoid defined by points A, B, C and D in FIG. 7.

5. The method of claim 1 wherein the ceramic body having a Vickers hardness (18.5 kg load) greater than or equal to about 17 GPa, and a fracture toughness ($K_{IC}$ Evans & Charles) greater than or equal to about 6.8 MPa·m$^{1/2}$.

6. The method of claim 1 further comprising the step of applying a coating scheme to the ceramic body, and the coating scheme comprises one or more coating layers.

7. The method of claim 6 wherein the applying step comprises applying a coating layer of alumina via chemical vapor deposition.

8. The method of claim 6 wherein the applying step comprises applying a coating layer of titanium aluminum nitride via physical vapor deposition.

9. The method of claim 1 wherein the ceramic body comprises a cutting insert having a rake surface and a flank surface, and a cutting edge at the juncture of the rake surface and the flank surface.

10. A method of making a SiAlON ceramic body that comprises a two phase composite comprising an alpha prime SiAlON phase and a beta prime SiAlON phase, the method comprising the steps of:
    providing a starting powder mixture that comprises at least about 70 weight percent silicon nitride powder and one or more other powders tat provide aluminum, oxygen, nitrogen, and at least two selected rare earth elements to the SiAlON ceramic body wherein the rare earth elements are selected from at least two groups of the following three groups of rare earth elements wherein Group I comprises La, Ce, Pr, Nd, Pm, Sm and Eu, and Group II comprises Gd, Tb, Dy and Ho, and Group III comprises Er, Tm, Yb and Lu; and wherein the beta-silicon nitride content of the silicon nitride powder has a lower limit equal to zero weight percent and an upper limit equal to about 1.6 weight percent of the silicon nitride powder; and
    consolidating the starting powder mixture to form a ceramic body comprising a two phase composite comprising an alpha prime SiAlON phase and a beta prime SiAlON phase, and the alpha prime SiAlON phase containing one or more of the selected rare earth elements excluding La and Ce.

11. The method of claim 10 wherein the ceramic body having a Vickers hardness (18.5 kg load) greater than or equal to about 17 GPa, and the fracture toughness ($K_{IC}$ Evans & Charles) greater than or equal to about 6.8 MPa·m$^{1/2}$.

12. The method of claim 10 wherein the ceramic body having the alpha prime SiAlON phase present an amount greater than or equal to about 35 weight percent of the two phase composite.

13. The method of claim 10 wherein the ceramic body having the alpha prime SiAlON phase present an amount greater than or equal to about 50 weight percent of the two phase composite.

14. The method of claim 10 SiAlON wherein the silicon nitride starting powder comprise at least about 80 weight percent of the starting powder mixture, and the ceramic body having the alpha prime SiAlON phase present in an amount greater than or equal to about 25 weight percent of the two phase composite.

15. The method of claim 10 wherein the silicon nitride starting powder contains about zero weight percent beta silicon nitride.

16. The method of claim 10 wherein the selected rare earth elements in the starting powder mixture comprise ytterbium and lanthanum, and the alpha prime SiAlON phase of the ceramic body contains ytterbium wherein there is no detectable amount of lanthanum in the alpha prime SiAlON phase of the ceramic body.

17. The method of claim 10 further including a step of applying a coating scheme to the ceramic body wherein the coating scheme comprises one or more coating layers.

18. The method of claim 10 wherein the ceramic body comprises a cutting insert having a rake surface and a flank surface, and a cutting edge at the juncture of the rake surface and the flank surface.

19. A method for making a SiAlON ceramic body that comprises a two phase composite comprising an alpha prime SiAlON phase and a beta prime SiAlON phase, the method comprising the steps of:

providing a starting powder mixture that includes silicon nitride powder and one or more powders that provide aluminum, oxygen, nitrogen, a liquid phase-forming element, and at least one selected rare earth element to the SiAlON ceramic body wherein: in the case of a single of the selected rare earth element, the selected rare earth element is selected from any of the following groups wherein Group I comprises Pr, Nd, Pm, Sm and Eu, and Group II comprises Gd, Tb, Dy and Ho, and Group III comprises Er, Tm, Yb and Lu; and in the case of a plurality of the selected rare earth elements, the rare earth elements are selected from at least two groups of the following three groups of rare earth elements wherein Group IA comprises La, Ce, Pr, Nd, Pm, Sm and Eu, and Group II comprises Gd, Tb, Dy and No, and Group III comprises Er, Tm, Yb and Lu; and consolidating the starting powder mixture to form a ceramic body comprising a two phase composite comprising an alpha prime SiAlON phase and a beta prime SiAlON phase, and the alpha prime SiAlON phase containing one or more of the selected rare earth elements excluding La and Ce; and the silicon nitride powder comprises at least about 70 weight percent of the starting powder mixture, the silicon nitride powder has a beta-silicon nitride content that has a lower limit equal to zero weight percent and an upper limit equal to about 1.6 weight percent of the silicon nitride powder.

20. The method of claim 19 wherein the silicon nitride powder in the starting powder mixture contains essentially zero weight percent beta silicon nitride.

* * * * *